United States Patent [19]

Lawson

[11] Patent Number: 4,761,535

[45] Date of Patent: Aug. 2, 1988

[54] LASER WIRE STRIPPER

[75] Inventor: William E. Lawson, Somerset, Wis.

[73] Assignee: Laser Machining, Inc., Somerset, Wis.

[21] Appl. No.: 108,541

[22] Filed: Oct. 13, 1987

[51] Int. Cl.$^4$ .............................................. B23K 26/00
[52] U.S. Cl. ........................... 219/121.68; 219/121.74
[58] Field of Search ................. 219/121 LH, 121 LJ, 219/121 LG, 121 LN, 121 LQ

[56] References Cited

U.S. PATENT DOCUMENTS 4,491,463  1/1985  Weinstein et al. ........... 219/121 LH

FOREIGN PATENT DOCUMENTS 0133992  7/1985  Japan ............................. 219/121 LL

OTHER PUBLICATIONS

Iceland, "Laser Wire Stripping: Equipment and Operation Notes" *Insulation/Circuits*, vol. 26, No. 4, Apr. 1980, pp. 47-50.

*Primary Examiner*—C. L. Albritton
*Attorney, Agent, or Firm*—Kinney & Lange

[57] ABSTRACT

A laser wire stripper in which energy from a laser is focused to a first point and then to a curved reflector and refocused to a second point displaced from the first point by an amount which permits the insertion of a strippable wire therebetween, the wire being laterally moved generally along a line between the two points so that the beams alternately cut the wire insulation from one side and then the other.

17 Claims, 1 Drawing Sheet

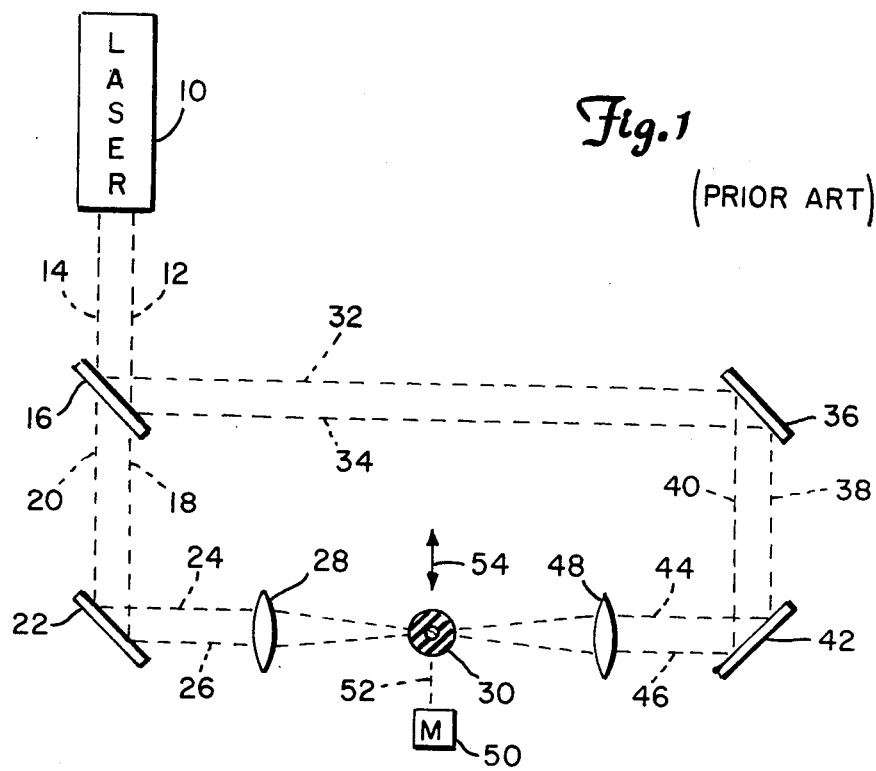
Fig.1 (PRIOR ART)
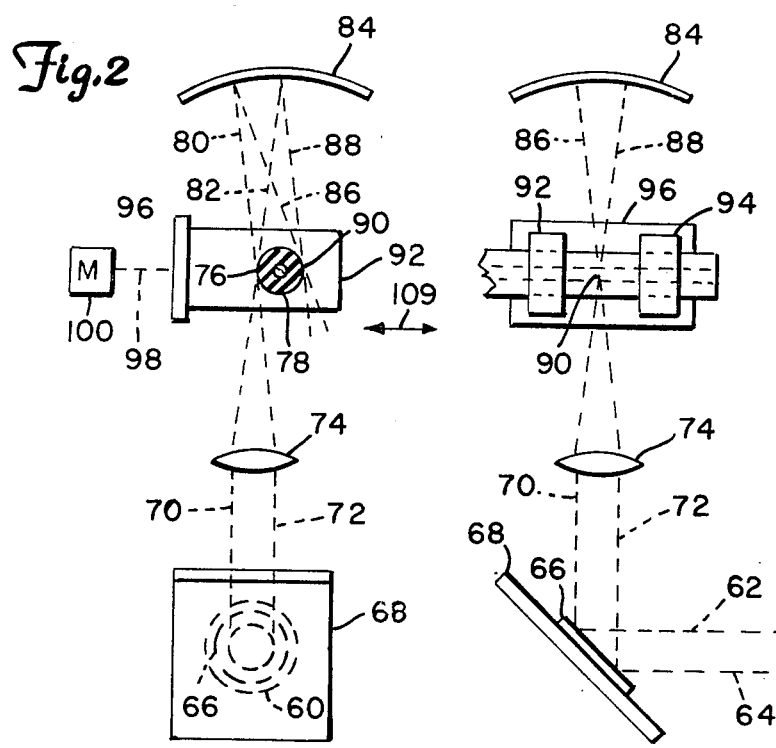
Fig.2
Fig.3

LASER WIRE STRIPPER

BACKGROUND OF THE INVENTION

1. Field of the Invention

The present invention relates to a wire stripper and, more particularly, to a laser wire stripper that does not involve the rotation of either the wire or the laser to accomplish a complete circumferential cut.

2. Description of the Prior Art

Laser wire stripping devices have a number of advantages over conventional wire stripping equipment. If used properly, the laser cuts only the insulation around the wire and does not have any effect on the wire itself. As a result, the possibility of nicking or cutting the wire is virtually eliminated. Laser strippers cut insulation, such as kapton, fabric covers and Teflon, that is difficult to strip conventionally. Lasers can strip very small wires because location of the wire at the focal point of the laser beam is not critical so long as it is close enough for the laser energy to vaporize the plastic insulation. Many laser strippers can also be used for center stripping and for stripping ribbon cables. Laser strippers are fast and reliable, and do not depend on the condition of blades that must be kept sharp. One way that lasers can be used to cut the insulation and not the wire is, for example, use of $CO_2$ lasers operating in the infrared region. This comes about because the insulation has low thermal conductivity, a low vaporization temperature and a high absorption of heat compared to the wire itself which has a high thermal conductivity, high melting temperature and a low absorption of radiant energy. Some newer lasers emit light in the ultraviolet region, and at these wave lengths the plastic insulation may be cut by disassociating the molecules rather than by vaporizing with heat. This is particularly desirable for very fine wires, e.g. 40 gauge and smaller, insulated with kapton.

The prior art includes three general kinds of laser wire strippers as follows: (1) Systems utilizing a laser and rotating the wire under a stationary beam. These systems have the drawback that the wire must be rotated and accurately positioned, which is often difficult to accomplish. (2) Systems in which the laser beam itself is rotated around the wire. Such systems have advantages where stationary shielded wires are to be stripped or where good control of the energy is required to prevent burning through the inner insulation. Such systems are very difficult to automate and require rather accurate wire location. (3) Systems utilizing a stationary laser, a stationary wire and a beam splitter to divide the laser beam into two portions each of which contains half the power. The two separate beams are generally directed so as to approach the wire from opposite directions and the beams are usually focused to a point in the center of the wire. Instead of rotating the wire, the wire is moved transversely across the laser beams and, accordingly, the insulation is cut on both sides at the same time. This has a number of advantages over the rotating wire or rotating laser system because it is more versatile, may be used for ribbon cable as well as round wire, allows for easy control of the strip length and is insensitive to the position of the wire. Even if the wire is out of position relative to the focus, it still gives a good cut as the top and bottom cuts still meet on the other side. Furthermore, the insulation can be cut lengthwise and, accordingly, center stripping is possible. The main difficulty with this system is the expense associated with having a beam splitter and three additional mirrors and two lenses.

SUMMARY OF THE INVENTION

The present invention overcomes the problems of the prior art by utilizing a single laser and a single lens and directing the energy to a first focal point. The energy passes through the first focal point and is thereafter intercepted by a curved reflector such as a spherical mirror which operates to redirect the energy to a second focal point spaced from the first focal point. When the wire is moved across the two foci, one side of the wire is first cut and then the other. Accordingly, the system has all the advantages of the split beam prior art system, but does not require the use of a beam splitter and three additional mirrors and requires only one focusing lens to obtain the desired performance.

BRIEF DESCRIPTION OF THE DRAWINGS

FIG. 1 is a drawing showing the split beam system available in the prior art;

FIG. 2 shows an elevational view of the present invention and a cross section of the wire to be stripped; and FIG. 3 shows a side view of the apparatus of FIG. 2.

DETAILED DESCRIPTION OF THE PREFERRED EMBODIMENTS

Because rotating wires and rotating lasers are unduly complex, a system utilizing a fixed laser and a non-rotating wire is desired. FIG. 1 shows one way that this has been accomplished in the prior art.

In FIG. 1, a laser 10 is shown projecting a beam of energy along a path shown by dashed lines 12 and 14 to a partly silvered mirror or beam splitter 16. Beam splitter 16 passes a portion of the energy from laser 10 along a path shown by dashed lines 18 and 20 to a mirror 22 which in turn reflects the beam along a path shown by dashed lines 24 and 26 to a lens 28 which focuses the beam to a point generally in the center of a wire 30 to be stripped.

Beam splitter 16 also directs a portion of the energy from laser 10 to the right in FIG. 1 along a path shown by dashed lines 32 and 34 to a mirror 36 which reflects the energy downwardly along a path shown by dashed lines 38 and 40 to yet another mirror 42. The beam is then reflected to the left along a path shown by dashed lines 44 and 46 to a second lens 48 which focuses the beam to a point which is also generally at the center of wire 30 but from the other side. If the wire 30 is very thick or if better energy distribution is desired, the lenses 28 and 48 may be positioned so as to move the foci apart from one another.

A motive means such as a motor 50 is connected to wire 30 by a connection shown as dashed line 52, and operates to move wire 30 upwardly or downwardly in FIG. 1 in a direction shown by arrow 54 so that the wire 30 passes through the laser beam from the two lenses 28 and 48. As it does so, the laser beams vaporize the insulation from both sides at the same time so that after a single pass the insulation has a complete cut therearound. A laser emitting infrared or ultraviolet radiation may be used to further assure that only the insulation and not the wire is cut. This system is quite easy to control and any smoke from the vaporization of the insulation is simple to exhaust. The system is insensitive to the position of the wire and even though displaced from the center a good cut can be made. If the wire is moved lengthwise into and out of the plane of the paper, a lengthwise cut can be made and, accordingly, by making two circumferential cuts separated from one another and then making a lengthwise cut therebetween a center strip of the wire can be removed. Even if the insulation is cut at an angle, a complete cut will be made since the foci are at the same point and they will meet at the other side regardless of how the wire passes through the beams. The system of FIG. 1 is, however, expensive because of the beam splitter 16 and the requirement for three mirrors 22, 36 and 42 as well as two lenses 28 and 48.

FIG. 2 shows a system which overcomes this difficulty by utilizing a single laser, a single lens and a spherical reflecting mirror to produce two focus points on opposite sides of the wire being stripped. More particularly, in FIGS. 2 and 3, a laser 60 is shown directing a beam of radiation along a path shown by dashed lines 62 and 64 to a mirror 66 mounted on an inclined member 68. Energy is reflected from mirror 66 upwardly along a path shown by dashed lines 70 and 72 to a lens 74 which operates to focus the beam to a point 76 which, in FIG. 2, is near the outer edge of a wire 78 to be stripped. Energy passes the focal point 76 in a path shown by dashed lines 80 and 82 to a curved, preferably spherical, mirror 84. Energy is reflected from mirror 84 along a path shown by dashed lines 86 and 88 to be refocused at a point 90 which, in FIG. 2 is near the other side of wire 78 from focus point 76. Wire 78 is held in position by a holding device such as shown in FIGS. 2 and 3 as a pair of holding members 92 and 94 having apertures therethrough sized to accept the wire 78 therein. Holding members 92 and 94 are mounted on a carrying member 96 which is connected by means shown as a dashed line 98 connected to a motive means such as motor 100. Motor 100 may be arranged to operate through a cam to drive carrying member 96 and holding members 92 and 94 back and forth in a direction shown by arrow 109 so as to move wire 78 across the beam proximate the two foci 76 and 90.

It is seen that as wire 78 is moved to the left in FIG. 2, the beam that forms focus point 76 will cut through the insulation on the bottom half of wire 78, and that as wire 78 is moved to the right in FIG. 2, the beam forming focal point 90 will cut through the insulation on the upper half of wire 78. Accordingly, if wire 78 starts from the far left in FIG. 2 and moves first through focal point 76 and then through focal point 90, the bottom half of the insulation and then the top half of the insulation will be cut so as to make a complete cut similar to that obtained in FIG. 1.

Obviously, when wire 78 is passing through focal point 76, the beam is blocked by the wire and energy does not reach mirror 84 for reflection to focal point 90. Accordingly, the diameter of wire 78 should not be made so large that focal point 90 and focal point 76 are within the interior of the cross section of the wire at the same time. In one practical system, a wire of one-quarter inch or less in diameter can be stripped when the foci are separated by approximately one-eighth inch to one-quarter inch. The positions of the foci may changed by changing the positions of mirror 84 and lens 74.

To provide a central strip, a complete pass can be made by motor 100 to produce a first cut, the wire moved to another position and a second cut made, and then the wire placed so that the focal point 76 or focal point 90 is midway between the edges of the wire at which time the wire can be translated into and out of the plane of FIG. 2 between the two cuts. This will allow the center portion to be removed in a straightforward, simple manner.

The present invention provides an inexpensive wire stripping system which has the additional advantage of being very simple to set up and operate. Of course, the specific holding means 92, 94 and 96 are a matter of design choice. Similarly, mirror 66 need not necessarily be employed since laser 60 could be positioned to point upwardly in FIG. 3 to obtain the same effect.

Accordingly, although the present invention has been described with reference to preferred embodiments, workers skilled in the art will recognize that changes may be made in form and detail without departing from the spirit and scope of the invention.

What is claimed is:

1. A wire insulation cutter comprising:
   energy source means;
   directing means for directing energy from the energy source means to a focus at a first point;
   reflecting means receiving the energy after passing the first point and reflecting the energy to a focus at a second point; and
   motive means for moving an insulated wire in a path which passes the first point and the second point in sequence, the energy focused at the first point cutting the insulation on one side of the wire and the energy focused at the second point cutting the insulation on the side opposite the one side of the wire.

2. Apparatus according to claim 1 wherein the energy source means includes a laser.

3. Apparatus according to claim 2 wherein the energy from the laser produces sufficient heat to cut the insulation but not the wire.

4. Apparatus according to claim 3 wherein the laser produces infrared energy.

5. Apparatus according to claim 4 wherein the laser is a $CO_2$ laser.

6. Apparatus according to claim 1 wherein the reflecting means is a spherical mirror.

7. Apparatus according to claim 6 wherein the energy source is a laser.

8. Apparatus according to claim 7 wherein the laser is a $CO_2$ laser to produce infrared energy.

9. Apparatus according to claim 2 wherein the laser produces ultraviolet energy.

10. The method of stripping a wire comprising the steps of:
    A. focusing a beam of energy to a first point;
    B. reflecting the beam to a focus at a second point; and
    C. moving an insulated wire past the first and second points in sequence to first cut the insulation on one side of the wire and second to cut the insulation on the other side of the wire to produce a full cut around the wire at a first location.

11. The method of claim 10 further including the step of:
    D. removing the insulation from the wire on one side of the cut.

12. The method of claim 10 further including the steps of:
    E. moving the insulated wire past the first and second points as in step C to produce a full cut around the wire at a second location; and F. moving the insulated wire past one of the first and second points along the length of the wire to produce a cut between the first and second locations.

13. The method of claim 12 further including the step of:

G. removing the insulation from the wire between the first and second locations.

14. The method of claim 10 wherein the beam of energy is infrared.

15. The method of claim 14 wherein the beam of energy is laser energy.

16. The method of claim 10 wherein the beam of energy is ultraviolet.

17. A wire insulation cutter comprising:

a $CO_2$ laser for producing a beam of infrared energy;

lens means located in the beam to focus the beam to a first point;

a spherical reflector positioned to receive the beam of energy after passing the first point, to reflect the beam and to focus the beam to a second point spaced from the first point; and motive means for moving a length of insulated wire in a direction transverse to the length of the wire proximate the first and second points in sequence so that the energy focused at the first point cuts the insulation but not the wire half way around the wire and the energy focused at the second point cuts the insulation but not the wire the other half way around the wire.

* * * * *